(12) United States Patent
Van Gestel et al.

(10) Patent No.: US 6,952,713 B1
(45) Date of Patent: Oct. 4, 2005

(54) INFORMATION PROCESSING DEVICE

(75) Inventors: Henricus A. W. Van Gestel, Eindhoven (NL); Klaas K. Raaijmakers, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/376,860

(22) Filed: Aug. 18, 1999

(30) Foreign Application Priority Data

Aug. 21, 1998 (EP) .................................. 98202797

(51) Int. Cl.[7] ........................................... G06F 15/16
(52) U.S. Cl. ........................ 709/202; 712/30; 712/31
(58) Field of Search ..................... 369/30.04, 30.18, 369/30.2, 30.4; 463/30–32, 236; 709/236, 709/206, 202; 712/30, 31

(56) References Cited

U.S. PATENT DOCUMENTS

| | | | | |
|---|---|---|---|---|
| 5,241,659 A | | 8/1993 | Parulski et al. | ............. 395/164 |
| 5,265,888 A | * | 11/1993 | Yamamoto et al. | ............ 463/10 |
| 5,721,827 A | * | 2/1998 | Logan et al. | ................ 709/217 |
| 5,726,688 A | * | 3/1998 | Siefert et al. | ................ 345/821 |
| 5,774,664 A | * | 6/1998 | Hidary et al. | ................ 725/110 |
| 5,909,638 A | * | 6/1999 | Allen | .......................... 725/146 |
| 5,915,001 A | * | 6/1999 | Uppaluru | .................. 379/88.22 |
| 6,040,829 A | * | 3/2000 | Croy et al. | .................. 345/864 |
| 6,209,007 B1 | * | 3/2001 | Kelley et al. | ............... 715/513 |
| 6,354,939 B1 | * | 3/2002 | Morita et al. | ............... 345/581 |
| 6,393,462 B1 | * | 5/2002 | Mullen-Schultz | ........... 709/206 |
| 6,446,261 B1 | * | 9/2002 | Rosser | ........................ 725/34 |
| 6,498,797 B1 | * | 12/2002 | Anerousis et al. | ........... 370/522 |

FOREIGN PATENT DOCUMENTS

| | | | | |
|---|---|---|---|---|
| WO | WO9722062 | 6/1997 | ............ | G06F 17/21 |
| WO | WO9722106 | 6/1997 | ............ | G09G 5/00 |
| WO | WO9747135 | 12/1997 | ............ | H04N 7/00 |

* cited by examiner

*Primary Examiner*—Viet D. Vu
*Assistant Examiner*—Jinsong Hu
(74) *Attorney, Agent, or Firm*—Gregory L. Thorne

(57) ABSTRACT

The invention relates to an information processing device (1), including a user control unit (2) for the selection of units of primary information to be processed and functions to be invoked. The device also includes storage means (3) for storing the primary information. From the selections made by the user the device derives personalizing information concerning the use of the device and the primary information processed with the device. The personalizing information is stored separately and represents a history of the usage of the device, thus making the device more personalized to its owner.

15 Claims, 1 Drawing Sheet

INFORMATION PROCESSING DEVICE

FIELD OF THE INVENTION

The invention relates to an information processing device.

BACKGROUND OF THE INVENTION

A device as defined above is widely known. For example, a CD-player or MP3-player processes digital audio files so as to make them audible through a headphone or loudspeaker. The audio files constitute primary information of the player, since it is the player's primary function to process and play the audio files. An MP3-player comprises a digital memory for storing the audio files, while a CD-player has removable storage means, i.e. respective CDs. As another example, an organizer or personal digital assistant (PDA) enables entry, storage and retrieval of digital data, such as addresses and appointments. Such digital data constitutes primary data of the organizer or PDA since it relates to the primary function of these devices.

A disadvantage of the known devices is that they are not emotionally linked to their owners and hence can readily be replaced by a similar device, since the primary information which is processed by one device can be easily copied to a similar device. An owner of such a device will have no feelings of attachment to the device, which makes the device less valuable to the owner.

OBJECT AND SUMMARY OF THE INVENTION

It is an object of the invention to provide a device that is emotionally linked to its owner and triggers feelings of attachment.

The information processing device according the principals of the present invention includes personalizing means, e.g. a software agent, which monitors the use of the device, i.e. the units of primary information which are being processed and which processing functions of the device are being invoked. From these observations, the personalizing means derive personalizing information which is stored in a non-volatile memory. The personalizing information may include the date of manufacture of the device and the date of acquisition by the owner, the total time of ownership, information about a person from whom a unit of primary information has been acquired, a date or city of the acquisition, a frequency of playing an audio-track, etc. After using the device for some time, the device has built up a history of personalizing information, which is valuable to its owner because it can trigger memories of events the device and the user were involved in during the ownership.

In one illustrative embodiment of the invention, a link is maintained between units of primary information and units of personalizing information which were derived from the use of said primary information. Whenever the primary information is being processed, the user has access to the related personalizing information, triggering memories of events involving the primary information.

In another illustrative embodiment of the invention, the related personalizing information is displayed on a graphical display while the primary information is being processed, e.g. when playing a particular audio track.

In another illustrative embodiment of the invention, personalizing information remains stored in the further storage means, even if the primary information it was derived from is erased from the storage means. The link between the two types of information is broken, but a trace of the erased primary information is preserved by its related personalizing information. For example, long after an audio track has been removed from an MP3-player, its title and the number of times it has been played could still be available.

In still an other embodiment of the invention, primary information can be exchanged with similar devices, for example by connecting two MP3-players, audio files can be transferred between them. Attached to a file thus transferred is a personal tag belonging to the owner of the sending device. The tag is detached from the transferred audio file by the receiving device and stored as personalizing information by its personalizing means. The personal tag may comprise a personal message from the owner of the sending device, or an artistic icon. This personal tag is still preserved in the MP3-player long after removal of the song from the player's memory.

It is an achievement of the invention that the user develops a feeling of attachment to the device according to the invention, making the device irreplaceable by another device, even if the other device contains the same primary information. By using the device for some time, the owner adds a personal element to it, which makes the device unique among similar devices.

The invention is particularly suitable for a digital audio players, such as MP3-players, or PDAs. The invention is also applicable, for example, to GSM telephones, remote controls, television receivers, video recorders etc.

BRIEF DESCRIPTION OF THE DRAWINGS

These and other aspects of the invention will be apparent from and elucidated by way of a non-limitative example with reference to a drawing in which.

DESCRIPTION OF EMBODIMENTS

Figure 1:
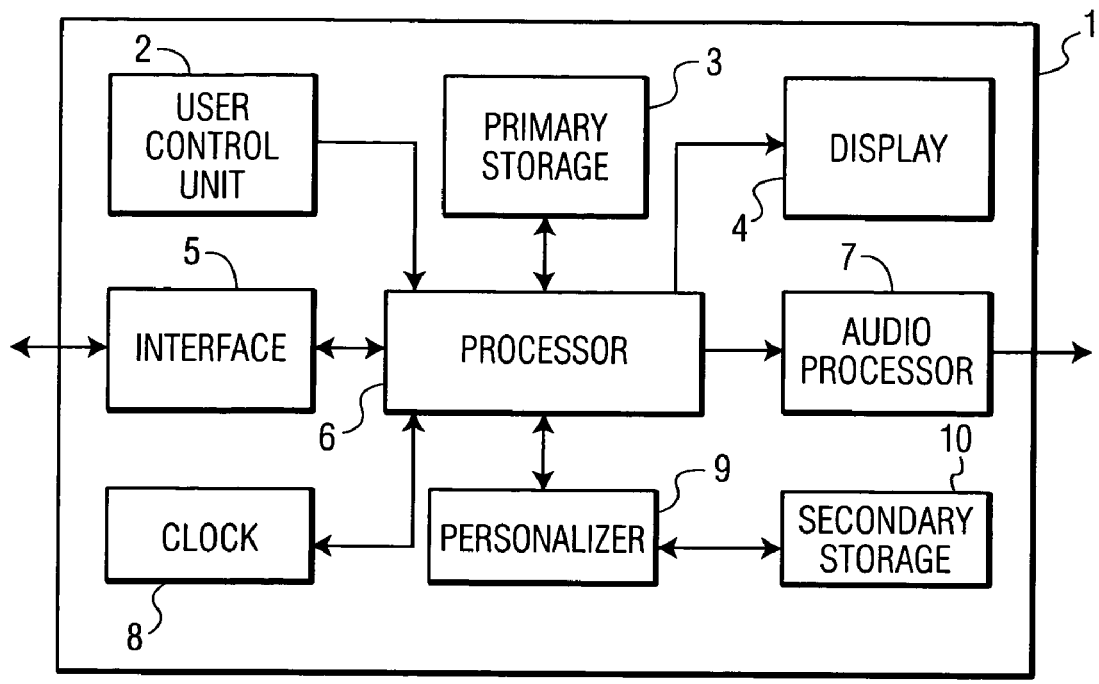
FIG. 1 shows an MP3-player as an embodiment of the device according to the invention.

The figure shows an MP3-player 1 which includes a user control unit 2, a primary storage 3, a graphical display 4, an interface 5, a microprocessor 6, an audio processor 7, a clock 8, a personalizer 9 and a secondary storage 10. The user operates the MP3-player 1 by means of the control unit 2 which sends commands to the microprocessor 6. The microprocessor 6 receives commands from the control unit 2; it sends and receives digital audio information through the interface 5, it controls the clock 8 and receives time signals from it. The microprocessor 6 also stores and retrieves digital audio information in the primary storage 3, sends graphical information to the display 4 and digital audio information to the audio processor 7. The audio processor 7 converts the digital audio signals into analog audio signals which can be further processed by a headphone or an amplifier (not shown). The personalizer 9 stores and retrieves digital data in the secondary storage 10 and communicates said digital data with the microprocessor 6.

The MP3-player 1 receives digital MPEG-3 audio files and descriptive information through the interface 5 and stores them in the primary storage 3. In response to a user command, any audio file in the primary storage 3 can be played through the audio processor 7 and listened to by means of e.g. a headphone. The descriptive information, e.g. comprising the title of the audio file, the composer and the performer, is displayed on the display 4 when the corresponding audio file is being played.

The audio files may be derived from a CD-player, from the internet or from a similar MP3-player. Audio files can also be sent to similar MP3-players through the interface 5. The owner of the MP3-player 1 can store a personal tag, e.g. a personal message, an e-mail address or an artistic icon, in the secondary storage 10. Such a tag could be prepared on a personal computer and be derived through the interface 5. When an audio file is sent to a similar MP3-player, the personal tag is sent along with the audio file. Upon reception of an audio file and a personal tag from a similar MP3-player, the personalizer 9 detaches the tag from the audio file. The audio file is stored in the primary storage 3, while the received personal tag is stored in the secondary storage 10, along with a time-stamp generated by the clock 8 and a reference to the audio file, which reference establishes a link between de audio file and the generated personalizing information. Whenever the audio file is played, the secondary storage 10 is searched for personalizing information comprising a reference to the audio file. If such information is found, it is displayed on the display 4 so as to remind the owner about the person from whom the audio file was acquired and e.g. the time and place of the acquisition. If said audio file is erased from the primary storage 3 in response to a user command, the related personal tag and time/place information are preserved in the secondary storage 10, together with the title of the audio file and statistical data, comprising e.g. the number of times the file was played. From each audio file which has ever been stored in the MP3-player 1, a trace is left in the secondary storage 10, triggering memories about the history of use of the MP3-player 1. The information in the secondary storage 10 thus personalizes the MP3-player 1, making its owner feel more attached to it. Besides information related to audio files, the secondary storage 10 also contains information about e.g. the date and place of purchase of the device, the total duration of the ownership, the number of hours of use, etc. The personalizing information in the secondary storage 10 can be browsed through by means of the control unit 2 and the display 4, but it cannot be altered, erased or copied through the interface 5. It becomes a part of the MP3-player 1, making it a unique device.

Figure 2:
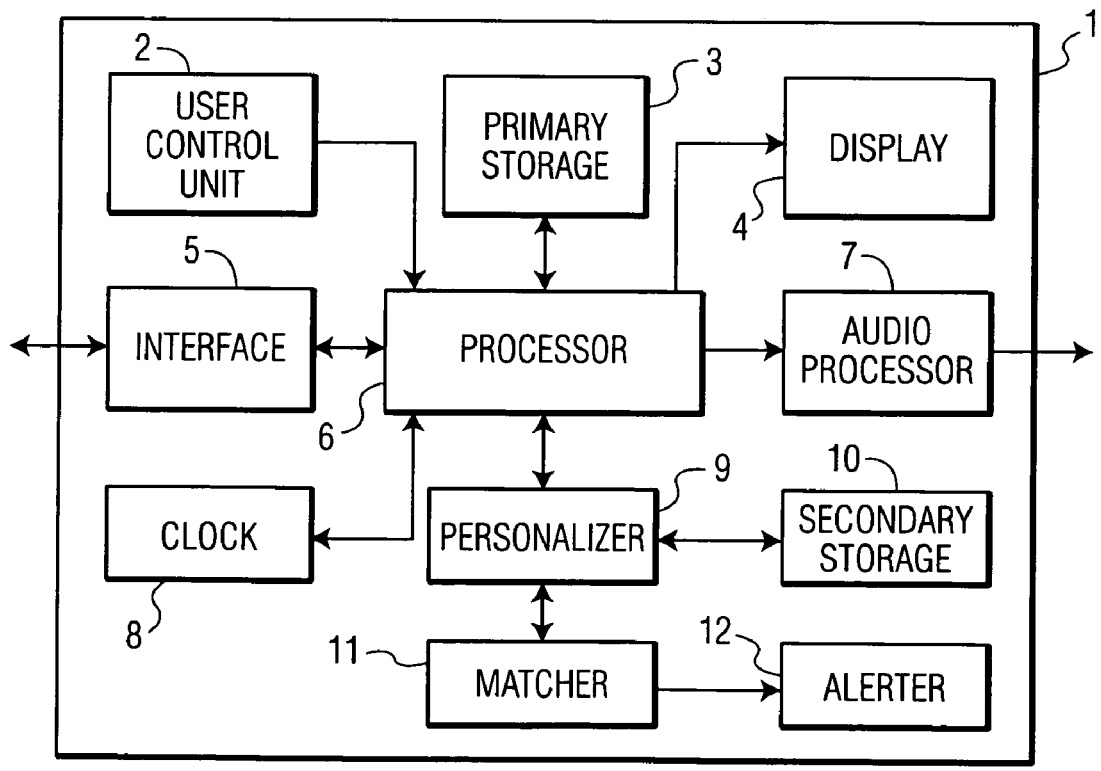
FIG. 2 shows a further MP3-player as an alternative embodiment of the device according to the invention.

FIG. 2 shows a further MP3-player as an embodiment of the device according to the invention. Reference numbers which occur in both figures denote the same components. The MP3-player of FIG. 2 includes additionally a matcher 11 and an alerter 12. The interface 5 is also arranged to communicate with similar devices within a restricted area, for example, having a radius of approximately 10 meters, for example by means of electro-magnetic waves or infrared signals. The personalizer 9 is also arranged to transmit parts of the personalizing information to similar devices within said area. For example, it could transmit identities of persons from whom audio files have been obtained recently. The personalizer 9 is also arranged to relay personalizing information received from similar devices within said area to the matcher 11. The matcher 11 compares the received personalizing information with the personalizing information in the secondary storage 10 and if they match to a certain degree, the alerter 12 is controlled to issue a signal to the owner. For example, if the personalizing information of the MP3-player 1 contains a reference to a particular person and the identity of that person is received from a similar MP3-player within said area, the owners of the two players are likely to have a common acquaintance; this could be the start of a conversation. The identity of said common acquaintance could be presented on the display 4. Furthermore, two MP3-players within a certain area exchange information about audio files which have been stored in the primary storage of both players in the past. If there is a substantial overlap, the owners will again be notified. Instead of a list of specific audio files, the personalizer 9 could be adapted to generate a user profile describing the owner's taste in more general terms, e.g. using categories which are rated according to the owner's taste. In this way, the personalized device according to the invention could play a role in bringing together people having similar tastes or common acquaintances.

Although the invention has been described with reference to specific illustrative embodiments, variations and modifications are possible within the scope of the inventive concept. Thus, for example, the primary storage 3 and the secondary storage 10 could be distinguishable parts of one large storage, e.g. a flash memory. The personalizer 9 could be a separate circuit or be implemented as a software function of the microprocessor 6. It is not a necessary requirement that the personalizing information cannot be altered, erased or copied. The possibility of making a backup could also be desirable, since the MP3-player could be lost or damaged. The MP3-player 1 could be equipped with a GPS-circuit, enabling the generation of personalizing information concerning the place where a particular event, e.g. transfer of an audio file, took place.

The invention can be applied to a PDA, the primary information then being addresses, appointments, notes etc. Such data could similarly be exchangeable with similar devices, and personalizing information could be generated in a way as described above. The invention could also be applied to a GSM telephone, the primary information then being telephone numbers and e-mails. Any time a particular number is dialed, personalizing information concerning the place and time and interlocutor is generated. Along with a phone conversation, a digital personal tag could be transferred and stored in the secondary storage of the interlocutor's phone.

What is claimed is:

1. An information processing device comprising:
   a first storage device for storing units of primary information;
   a user operable interface for making selections from the stored units of primary information to be processed and/or from functions to be invoked;
   a second storage device;
   a presentation device for presenting information; and
   a personalizing processor configured for deriving, from said selections, personalizing information that includes information other than the mere fact that the selected units were selected, in order to store the derived personalizing information in the second storage device said processor being further configured to, in response to a unit of said stored units of primary information being processed:
   a) retrieve, from the second storage device, a respective portion of the stored, derived, personalizing information; and
   b) operate the presentation device to present the retrieved portion, the device including communication means for exchanging units of primary information with a similar information processing device, wherein the personalizing means is arranged to attach a personal tag to a unit of primary information to be sent to the similar information processing device, the personalizing means also being arranged to detach a personal tag from a received unit of primary information and store it as personalizing information in the second storage device.

2. The device according to claim 1, wherein the personalizing processor is configured to maintain a link between a respective unit of said primary information and a respective unit of the stored, personalizing information.

3. The device according to claim 2, wherein the presenting, by the presentation device, of said retrieved personalizing information presents said respective unit of the personalizing information while said respective unit of said primary information is being processed.

4. The information processing device of claim 1, wherein the deriving serves to personalize stored units of primary information corresponding to said selections to form the derived personalizing information to be stored in the second storage device.

5. The information processing device of claim 4, wherein said second storage device is in communicative connection with said first storage device.

6. The information processing device of claim 1, wherein said second storage device is in communicative connection with said first storage device.

7. The information processing device of claim 1, wherein said personalizing information comprises an e-mail address.

8. The information processing device of claim 1, wherein said information processing device is a mobile device.

9. The information processing device of claim 1, configured as a consumer electronics device, and so as not to enable the stored, personalizing information to be erased from or altered on said second storage device, so that the second storage device is non-removable, and so that the first storage device is either removable by a user of said information processing device or, if non-removable, the units of primary information are erasable from the first storage device.

10. An information processing device comprising:
   a first storage device for storing units of primary information;
   a user operable interface for making selections from the stored units of primary information to be processed and/or from functions to be invoked;
   a second storage device; and
   a personalizing means for deriving personalizing information from said selections in order to store the personalizing information in the second storage device, the personalizing means being arranged to maintain a link between a respective unit of said primary information and a respective unit of the personalizing information, the information processing device being arranged to erase a respective unit of primary information in response to a user command, wherein the personalizing means is arranged to remove a link between the respective unit of primary information and a respective unit of personalizing information, and to preserve the storage of the respective unit of personalizing information in the second storage device.

11. A method for processing information, the method comprising the steps of:
   storing of primary information;
   selecting a portion of the primary information;
   deriving personalizing information for the selected portion of the primary information so as to maintain a link between a respective unit of said primary information and a respective unit of the personalizing information;
   storing of the personalizing information; and
   erasing a respective unit of primary information in response to a user command by removing a link between the respective unit of primary information and a respective unit of personalizing information so as to preserve the storage of the respective unit of personalizing information in the second storage device.

12. The method of claim 11, further including the step of deriving a history of personalizing information, using two or more selected portions of primary information.

13. An information processing device comprising:
   a memory for storing primary information;
   an interface, wherein at least a portion of said primary information is selected; and
   a processor that is operable to (1) process said portion of said selected primary information and (2) deriving personalizing information for said selection portion, said processor being arranged to maintain a link between a respective unit of said primary information and a respective unit of the personalizing information and, in erasing a respective unit of primary information in response to a user command, to remove a link between the respective unit of primary information and a respective unit of personalizing information so as to preserve the storage of the respective unit of personalizing information in the second storage device.

14. The information processing device of claim 13, wherein the processor is further operable for storing the personalizing information in the memory.

15. The information processing device of claim 13, wherein the processor is further operable for deriving a history of personalizing information, using two or more selected portions of primary information.

* * * * *